United States Patent [19]

Wittekind et al.

[11] Patent Number: 4,863,601

[45] Date of Patent: Sep. 5, 1989

[54] FILTER APPARATUS WITH HYDROPHILIC FILTER MATERIAL AND HYDROPHOBIC SUPPORT

[75] Inventors: Jürgen Wittekind, Frankfurt am Main; Hans-Joachim Hampel, Eschborn, both of Fed. Rep. of Germany

[73] Assignee: Jacobs Suchard GmbH, Bremen, Fed. Rep. of Germany

[21] Appl. No.: 184,295

[22] Filed: Apr. 21, 1988

[30] Foreign Application Priority Data

Apr. 23, 1987 [DE] Fed. Rep. of Germany ....... 3713609

[51] Int. Cl.$^4$ ............................................. B01D 23/28
[52] U.S. Cl. ..................................... 210/474; 210/479; 210/506; 426/82; 426/84; 248/94; 99/295; 206/.05
[58] Field of Search ...................... 106/287.17, 287.35, 106/2; 426/77, 82, 83, 84; 137/343; 210/474, 477, 478, 479, 480, 481, 493.5, 497.01, 497.3, 504, 506; 99/295, 296, 324; 248/94, 99, 95; 206/.05

[56] References Cited

U.S. PATENT DOCUMENTS

| | | | |
|---|---|---|---|
| 2,863,376 | 12/1958 | Grose | 99/316 |
| 3,121,657 | 2/1964 | Magill | 426/84 |
| 3,373,043 | 3/1968 | Rubenstein | 426/84 |
| 3,386,834 | 6/1968 | Noiset et al. | 426/84 |
| 3,579,351 | 5/1971 | Wege et al. | 426/82 |
| 3,615,708 | 10/1971 | Abile-Gal | 426/77 |
| 3,971,305 | 7/1976 | Daswick | 99/295 |
| 4,417,504 | 11/1983 | Yamamoto | 426/77 |
| 4,519,911 | 5/1985 | Shimizu | 426/82 |
| 4,584,101 | 4/1986 | Kataoka | 426/82 |
| 4,715,271 | 12/1987 | Kitagawa | 99/306 |

FOREIGN PATENT DOCUMENTS

| | | |
|---|---|---|
| 131465 | 4/1901 | Fed. Rep. of Germany . |
| 1546343 | 4/1970 | Fed. Rep. of Germany . |
| 7625484 | 1/1977 | Fed. Rep. of Germany . |
| 812235 | 5/1937 | France ................... 426/82 |
| 1534274 | 7/1968 | France . |
| 1562031 | 4/1969 | France . |
| 2128945 | 10/1972 | France . |
| 2143267 | 2/1973 | France . |
| 410324 | 10/1966 | Switzerland . |
| 631483 | 11/1949 | United Kingdom . |

Primary Examiner—Richard V. Fisher
Assistant Examiner—Wanda L. Millard
Attorney, Agent, or Firm—Burns, Doane, Swecker & Mathis

[57] ABSTRACT

A filter bag is positioned inside and fastened to a holding frame. The holding frame has substantially vertical walls and is adapted to be placed on the edge of a coffee cup or the like. The sides of the holding frame that face the filter bag are made of hydrophobic material. The filter bag is made of nonwoven hydrophilic filter material.

34 Claims, 3 Drawing Sheets

FILTER APPARATUS WITH HYDROPHILIC FILTER MATERIAL AND HYDROPHOBIC SUPPORT

BACKGROUND OF THE INVENTION

The invention relates to a filter, and more particularly especially a coffee filter, and to a method for producing a coffee filter.

It is known to fill infusion bags with tea and also ground coffee, the filling quantity being intended for one or more cups. However, after brewing, coffee infusion bags result in an unsatisfactory drink because the extract content is too low, or the bags have to be agitated intensively in the cup for a long enough time to achieve the necessary extract content. Furthermore, the ground coffee absorbs a considerable quantity of water and as a result, the cup is no longer full after the bag has been taken out.

Starting from this state of the art, the applicant has already proposed providing a filter, especially a coffee filter, which is characterized by a holding frame which can be placed on the edge of a cup or such like preparation vessel and which has vertical or approximately vertical walls, and by a bag fastened inside this frame and consisting of filter material, especially filter paper, the filter bag being fastened to the holding frame along the entire inner peripheral edge of the frame, so that the entire free cross-section of the holding frame is filled by the filter bag. Preferably, the holding frame is triangular, as seen in horizontal projection, the walls being produced from a paperboard or cardboard blank. In the last-mentioned embodiment, the cardboard blank which can be unfolded into a triangle is foldable inwards, preferably on at least one side, to form an M-fold with the respective adjoining side walls of the cardboard blank forming the triangular frame.

The significance of the proposal mentioned is, therefore, that a cup filter distinguished by being highly functional and easy to handle is provided.

It will now be shown that, when a filter of this type is used, the filter bag is pressed in the upper region against the holding frame or its vertical walls by the brewing water. At the same time, the infusion flowing through the nonwoven material endeavours to run off along both the filter bag and the holding frame or its walls. However, contact between the coffee infusion and the cardboard is undesirable for reasons of acceptability. Furthermore, there is the danger that some of the coffee will flow along the holding frame or its walls next to the cup or the like.

The object of the present invention is, therefore, to provide a filter of the type mentioned, in which the infusion or coffee runs off into the cup or the like along the filter bag only. This object is achieved through the use of a filter according to the present invention and through the method for producing such a filter;

The measures according to the invention ensure that the infusion flowing through the filter bag runs off into the cup or such like vessel along the filter bag only, and conventional grades of cardboard or paperboard can be used for producing the holding frame.

According to the invention, therefore, it is necessary to ensure that the holding frame is made hydrophobic, that is to say water-repellent, on the side facing the filter bag, whereas the filter bag itself is to consist of a hydrophilic filter material. The filter bag must therefore have good wettability with water, so that the infusion runs off into the cup solely along the filter bag. Conventional nonwoven filter materials with a non-oriented fibre arrangement and a comparatively smooth surface are unsuitable for this; despite the use of a hydrophobised holding frame, the infusion for the most part runs off along this and past the cup.

According to the invention, the aim sought after, as regards the design of the filter bag, is achieved in an especially simple way in that the nonwoven filter material has a fibre arrangement which is oriented at least partially, but preferably predominantly, in the direction of flow of the infusion, and/or in that the nonwoven filter material has a surface of a textile-like structure. The last-mentioned design and the resulting roughness of the surface structure ensure a certain "adhesion" of the liquid film on the filter bag which assists the run-off along the filter bag.

Nonwoven materials suitable for this have a weight per unit area of between 16 and 17 $g/m^2$, preferably approximately 16.5 $g/m^2$, and a thickness of between 0.05 and 0.07 mm, preferably approximately 0.056 mm.

Especially good results, also in terms of processibility, are obtained if the nonwoven materials consist of a natural-fibre base layer, onto which fusiable plastic fibres are coated as a heat-sealable layer.

The holding frame or its vertical walls preferably consist of cardboard or paperboard, the side facing the filter bag being hydrophobised in such a way that, when wetted with a drop of water, a wetting angle of $>100°$, especially $>105°$, is obtained.

In order to make the paperboard hydrophobic in this way, the appropriate size is treated with means which react chemically with the functional hydroxy groups of cellulose, especially with a mixture of dimeric alkylketene, water and ammonium zirconium carbonate.

In order to make the paperboard hydrophobic, it can also be treated with means which, in a chemical process, precipitate on the fibre to form a water-insoluble water-repellent compound, especially with an aqueous sodium stearate and aluminium acetate solution.

An especially preferred process for hydrophobising the paperboard or the paperboard blank for producing a holding frame for a filter of the type described is characterized in that a mixture of 68 ml of 20% aqueous dispersions of a dimeric alkylketene in water, 910 ml of water, 22 ml of a 20% ammonium zirconium carbonate solution dissolved in water in quantities of approximately 20 to 50 $g/m^2$ is coated onto the side of the paperboard to be hydrophobised and is dried at approximately 120° C.

Another process for hydrophobising the paperboard is characterized in that approximately 30 $g/m^2$ of a 1% aqueous sodium stearate solution are coated onto the paperboard, in order then to apply approximately 30 $g/m^2$ of a 1.5% aluminium acetate solution to the still moist paperboard, and in that the paperboard so treated is subsequently dried at approximately 60° C.

A wetting angle of 120° is obtained as a result of the first-mentioned process; a wetting angle of 124° is obtained as a result of the second-mentioned process.

Tests were conducted with a paperboard having a a weight of approximately 180 and 240 $g/m^2$, a gluing coefficient in the range of between approximately 1.5 and 15 and a porosity of between approximately 15 and 250 Gurleys per second.

It was found, furthermore, that hydrophobising sufficient even under contact with hot water can be achieved only if the paperboard used meets certain requirements. Thus, the latter should not contain even traces of any substances with the character of a wetting agent as a result of its production process, since these would counteract the hydrophobic effect.

The said hydrophobising agents can also be added during the production of the paperboard from paper pulp.

It is necessary to ensure, at all events, that the hydrophobising agent is anchored so firmly to the cellulose fibre of the fibrous material that it cannot be washed off by the hot infusion.

To prevent the paperboard holding frame from being made hydrophobic, the present invention provides an alternative which is characterized in that a hydrophobically active skirt is arranged in the upper region between the filter bag on the one hand and the holding frame or its walls on the other hand. This skirt preferably consists of a thin film, for example polyethylene film, which is incorporated and welded in during the production of the filter. Because this skirt is arranged in the upper region between the filter bag and the holding frame, the water poured in can flow off downwards, without reaching the holding frame or its paperboard walls.

Moreover, the thickness of the paperboard walls of the holding frame is between approximately 0.2 and 0.4, preferably approximately 0.3 mm.

As already stated above, to obtain a high degree of hydrophobisation it is important that the initial paperboard should not contain any substances with the character of a wetting agent as a result of its production, since these would counteract the hydrophobic effect. It is possible to check this by means of a measurement of the wetting angle; the wetting angle of the untreated paperboard should be more than 80°.

BRIEF DESCRIPTION OF THE DRAWINGS

Two exemplary embodiments of a cup filter designed and produced according to the invention are explained below with reference to the accompanying drawings, in which.

DETAILED DESCRIPTION OF THE PREFERRED EMBODIMENTS OF THE PRESENT INVENTION

Figure 1:
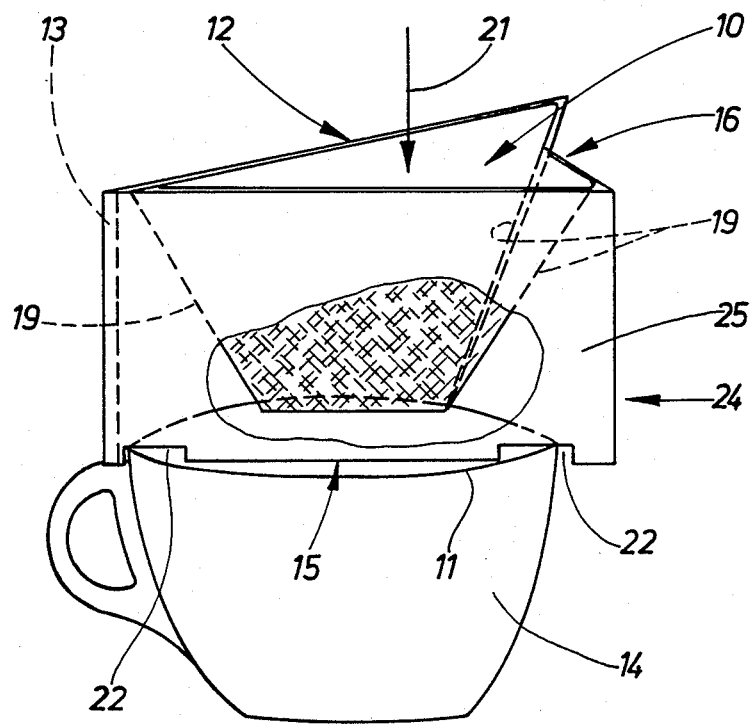
FIG. 1 is perspective view of a cup filter placed on a cup.

To produce a cup filter of a type to be described in more detail, two webs of nonwoven filter material and of cardboard of essentially the same size, in particular the same width, are conveyed onto one another to form a two-ply web of material. A continuous sealing seam is made uninterruptedly on one longitudinal edge, for example by means of wheel-shaped sealing tools. Both the nonwoven filter material and the cardboard or paperboard must therefore consist of a sealable material or be surface-coated with a sealable material in the region of the sealing seam. The continuous double-web or two-ply structure is then divided into blanks which correspond to the length necessary for a cup filter. The two plys of each blank are now folded apart from one another, so that a cardboard blank and a nonwoven filter blank lie next to one another, but remain joined together, as before, by means of the said sealing seam. In this position, the two blanks are first folded centrally, and then an M-fold 16 is made according to FIGS. 1 and 2 by means of a continuously operating folding tool. Sealing is then carried out at the free end edges of the paperboard blank, to form a corresponding edge-sealing seam 13 (see FIGS. 1 and 2). Subsequently, but preferably simultaneously, the nonwoven filter blank projecting from the paperboard blank and likewise characterized on one side by the saie M-fold 16 is provided with a trapezoidal sealing seam 19, to form a filter bag 10. The gussets of nonwoven filter material which protrude laterally or at the corners during this sealing are severed or cut off, so that the filter bag 10 acquires a general trapezoidal shape.

Subsequently, the filter bag 10, which is not in an inverted position outside the walls 25 of a triangular paperboard holding frame 24, is brought between the walls 25 of the frame 24 by being turned inside out, for example by means of compressed air, so that the filter assumes a shape corresponding to FIG. 1 or 2. In the embodiment described, the paperboard blank forms an unfoldable triangular frame for the filter bag 10 which is connected, in particular sealed, to the paperboard blank along the entire upper edge 12.

By means of the M-fold 16, the cup filter produced in the way described can be folded together flat and, by being unfolded, can be matched to different edge diameters of coffee cups or the like, in such a way that, after it has been placed on the cup edge 11, it does not slip off directly from this, that is to say it stands firmly on the cup edge 11. In FIG. 1, a cup filter produced in a way described is placed on the edge 11 of a cup 14.

Figure 2:
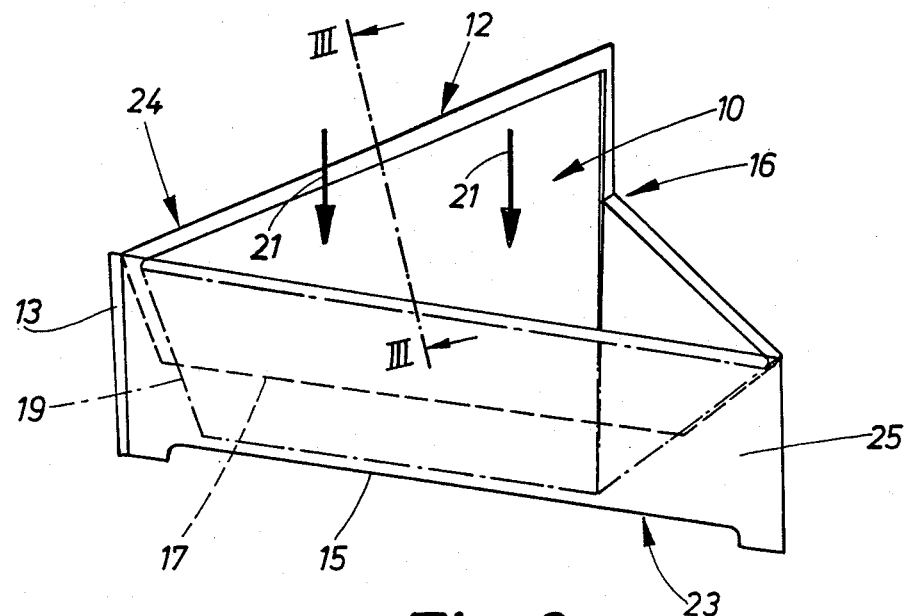
FIG. 2 is a perspective view of a modified embodiment of a cup filter.
Figure 3:
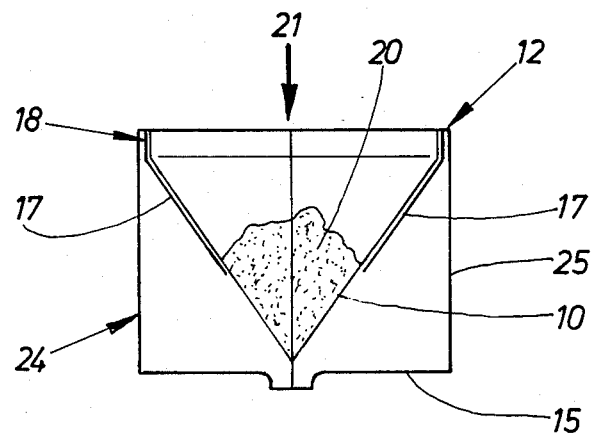
FIG. 3 is a cross-sectional view of the cup filter along the line III—III in according to FIG. 2.

Preferably, the filter bag 10 is filled at the manufacturer's with a predetermined quantity of coffee 20 (see FIG. 3). After filling, the cup filter is folded together flat, closed along the upper edge 12, for example by means of an adhesive strip or a closing tab, and is subsequently accommodated in an air-tight and aroma-tight manner, preferably vacuum-packaged, in an outer wrapping. During use, this outer wrapping is torn open and removed, the abovementioned adhesive strip is pulled off, and the cup filter is unfolded and placed on a cup or the cup edge 11 of a cup 14. Subsequently, the one-cup quantity of coffee can be brewed with hot water. The direction of infusion is represented in FIGS. 1 to 3 by the arrow 21.

In order to increase the standing stability of the cup filter described or of the paperboard blank unfoldable into a triangle on the cup edge 11 of a cup 14, the paperboard frame produced from the blank can be recessed at its supporting edge 15 assigned to the cup 14, in such a way that it cannot slip off sideways from the cup edge directly.

In FIG. 1, recesses of this type are denoted by the reference numeral 22. In the embodiment according to FIGS. 2 and 3, the recesses 22 corresponding to FIG. 1, which are arranged at the ends, are combined into a single recess 23, and these at the same time define the supporting edge 15 of the respective walls 25 of the holding frame 24.

The filter bag 10 consists of a nonwoven material, as described in detail further above.

In the embodiment according to FIG. 1, the inner faces of the walls 25 consisting of paperboard are made hydrophobic. Attention is likewise drawn, in this respect, to the statements made above.

The embodiment according to FIGS. 2 and 3 differs from that according to FIG. 1 in that the paperboard walls 25 of the holding frame 24 do not have to be hydrophobised. Instead, a strip-like consisting of a thin film, for example polyethylene film, is arranged between the filter bag 10 and the vertical walls 25 of the holding frame 24. Within the scope of the above-described production of a cup filter, the skirt 17 can be incorporated and welded in between the paperboard blank and the associated blank of filter material. The skirt 17 is located in an upper region between the filter bag 10 and the holding frame 24 or its vertical side walls 25, so that the water poured in (arrow 21) can flow off downwards and does not reach the normally hydrophilic paperboard walls 25. The sealing line of the skirt 17 between the filter bag 10 on the one hand and the vertical walls 25 of the holding frame 24 on the other hand is represented by the reference numeral 18 in FIG. 3.

The skirt 17 can likewise consist of paperboard or paper which is made hydrophobic on the side facing the filter bag 10, for example according to one of the processes described in the introduction.

Figure 4A:
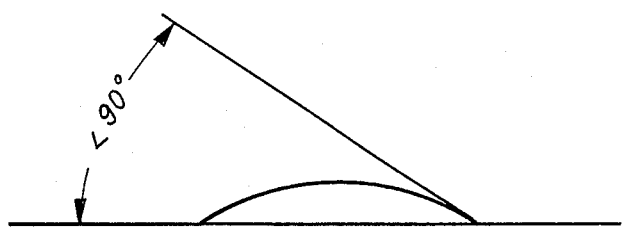
FIGS. 4a, b and c show diagrammatic representations to explain the concept of the wetting angle used here.
Figure 4B:
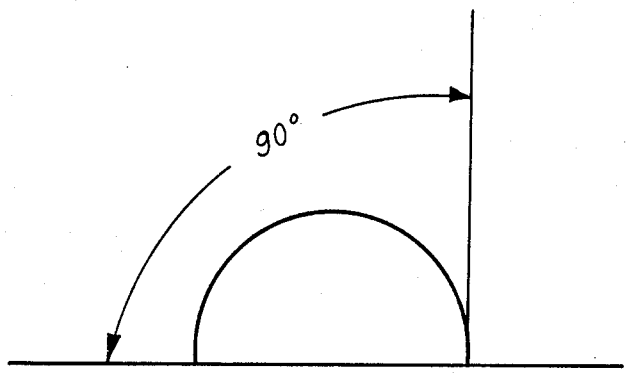
Figure 4C:
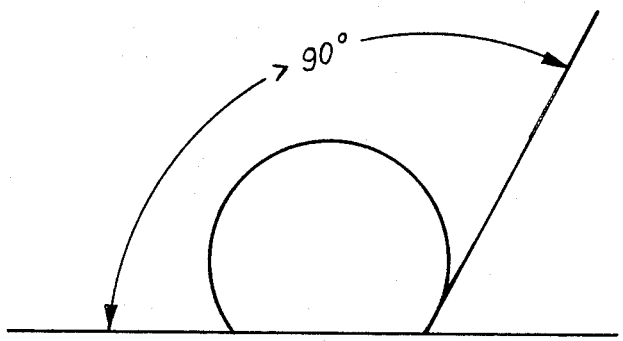

The concept of the wetting angle used here will be explained briefly with reference to FIGS. 4a, 4b and 4c. Accordingly, the wetting angle is a measure of the wettability of the surface. According to FIGS. 4a to 4c, the wetting angle is the angle between the wetted surface and the water drop, the latter being included, FIG. 4a showing a wetting angle of <90°, FIG. 4b a wetting angle of 90° and FIG. 4c a wetting angle of >90°. Correspondingly, a wetting angle of <90° means good wetting, a wetting angle of 90° means poor wetting and a wetting angle of >90° means virtually no wetting of a firm base.

All the features disclosed in the application documents are claimed as essential to the invention, in so far as they are new in relation to the state of the art either individually or in combination.

What is claimed is:

1. A filter for use in preparing beverages comprising:
    a holding frame having substantially vertical walls and being adapted to be placed on an edge of a beverage container; and
    a filter bag attached to the holding frame, said filter bag being positioned within said holding frame and between said substantially vertical walls, said filter bag being manufactured from nonwoven hydrophilic filter material and said holding frame being manufactured from a material which is treated, at portions facing the filter bag, with a mixture of dimeric alkylketene, water and ammonium zirconium carbonate that react chemically with functional hydroxy groups of said holding frame material, whereby the portions that face the filter bag are made hydrophobic so as to have a wetting angle greater than 100°.

2. A filter in accordance with claim 1, wherein the nonwoven filter material has a fiber arrangement that is oriented at least partially in a direction of infusion flow.

3. A filter in accordance with claim 2, wherein the nonwoven filter material has a surface of a textile-like structure.

4. A filter in accordance with claim 3, wherein the nonwoven filter material has a weight per unit area of between approximately 15 and 19 g/m$^2$ and a thickness of between approximately 0.03 and 0.09 mm.

5. A filter in accordance with the claim 4, wherein the nonwoven filter material includes a natural fiber base layer onto which fusible plastic fibers are coated to thereby form a heat-sealable layer.

6. A filter in accordance with claim 1, wherein the material from which the holding frame is manufactured is paperboard.

7. A filter in accordance with claim 6, wherein the paperboard is free of substances having the character of a wetting agent.

8. A filter in accordance with claim 7, wherein the paperboard has a weight of approximately 180 to 240 g/m$^2$, a gluing coefficient in the range of approximately 1.5 to 15 and a porosity of between approximately 50 and 250 Gurleys per second.

9. A filter in accordance with claim 8, and further comprising a hydrophobic skirt made of polyethylene that is attached to an upper region of the holding frame between the filter bag and the holding frame.

10. A filter in accordance with claim 1, wherein the material from which the holding frame is manufactured is cardboard.

11. A process for imparting a hydrophobic property to a material for producing a holding frame for a filter in accordance with claim 1, wherein a mixture of
    68 ml of 20% aqueous dispersion of a dimeric alkylketene in water,
    910 ml of water, and
    22 ml of a 20% ammonium zirconium carbonate solution dissolved in water
is coated in quantities of approximately 20 to 50 g/m$^2$ onto the portion of the material of the holding frame to be rendered hydrophobic and is dried at approximately 125° C.

12. A filter in accordance with claim 1, wherein the nonwoven filter material has a surface of a textile-like structure.

13. A filter in accordance with claim 1, wherein the nonwoven filter material has a weight per unit area of between approximately 15 and 19 g/m$^2$, and a thickness of between approximately 0.03 and 0.09 mm.

14. A filter in accordance with claim 1, wherein the nonwoven filter material includes a natural fiber base layer onto which fusible plastic fibers are coated to thereby form a heat-sealable layer.

15. A filter in accordance with claim 1, wherein the material from which the holding frame is manufactured is free of substances having the character of a wetting agent.

16. A filter in accordance with claim 1, wherein the material from which the holding frame is manufactured has a weight of approximately 180 to 240 g/m$^2$, a gluing coefficient in the range of approximately 1.5 and 15 and a porosity of between approximately 50 and 250 Gurleys per second.

17. A filter in accordance with claim 1, and further comprising a hydrophobic skirt made of polyethylene that is attached to an upper region of the holding frame between the filter bag and the holding frame.

18. A filter for use in preparing beverages comprising:
    a holding frame having substantially vertical walls and being adapted to be placed on an edge of a beverage container; and a filter bag attached to the holding frame, said filter bag being positioned within said holding frame and between said substantially vertical walls, said filter bag being manufactured from nonwoven hydrophibic filter material and said holding frame being manufactured from a fiber material and wherein a portion of the material from which the holding frame is manufactured that faces the filter bag is made hydrophobic so that it has a wetting angle greater than 100°, the portion of the material that faces the filter bag being made hydrophobic by treating the material with an aqueous sodium stearate and aluminum acetate solution which forms a water insoluble and water repellent precipitate on fibers of the fiber material.

19. A filter in accordance with claim 18, wherein the nonwoven filter material has a fiber arrangement that is oriented at least partially in a direction of infusion flow.

20. A filter in accordance with claim 19, wherein the nonwoven filter material has a surface of a textile-like structure.

21. A filter in accordance with claim 20, wherein the nonwoven filter material has a weight per unit area of between approximately 15 l and 19 g/m$^2$, and a thickness of between approximately 0.03 and 0.09 mm.

22. A filter in accordance with claim 21, wherein the nonwoven filter material includes a natural fiber base layer onto which fusible plastic fibers are coated to thereby form a heatsealable layer.

23. A filter in accordance with claim 18, wherein the material from which the holding frame is manufactured is paperboard.

24. A filter in accordance with claim 23, wherein the paperboard is free of substances having the character of a wetting agent.

25. A filter in accordance with claim 24, wherein the paperboard has a weight of approximately 180 to 240 g/m$^2$, a gluing coefficient in the range of approximately 1.5 to 15 and a porosity of between approximately 50 and 250 Gurleys per second.

26. A filter in accordance with claim 25, and further comprising a hydrophobic skirt made of polyethylene that is attached to an upper region of the holding frame between the filter bag and the holding frame.

27. A filter in accordance with claim 18, wherein the material from which the holding frame is manufactured is cardboard.

28. A process for imparting a hydrophobic property to a material for producing a holding frame for a filter in accordance with claim 18, wherein approximately 30 g/m$^2$ of a 1% aqueous sodium stearate solution is coated on the fiber material of the holding frame in order to then apply approximately 30 g/m$^2$ of a 1.5% aluminum acetate solution to the fiber material of the holding frame when it is still moist, and then subsequently drying the fiber material at approximately 60° C.

29. A filter in accordance with claim 18, wherein the nonwoven filter material has a surface of a textile-like material.

30. A filter in accordance with claim 18, wherein the nonwoven filter material has a weight per unit area of between approximately 15 and 19 g/m$^2$ and a thickness of betweemn approximately 0.03 and 0.09 mm.

31. A filter in accordance with claim 18, wherein the nonwoven filter material includes a natural fiber base layer onto which fusible plastic fibers are coated to thereby form a heat-sealable layer.

32. A filter in accordance with claim 18, wherein the material from which the holding frame is manufactured is free of substances having the character of a wetting agent.

33. A filter in accordance with claim 18, wherein the material from which the holding frame is manufactured has a weight of approximately 180 to 240 g/m$^2$, a gluing coefficient in the range of approximately 1.5 to 15 and a porosity of between approximately 50 to 250 Gurleys per second.

34. A filter in accordance with claim 18, and further comprising a hydrophobic skirt made of polyethylene that is attached to an upper region of the holding frame between the filter bag and the holding frame.

* * * * *